United States Patent [19]

Agrawal

[11] Patent Number: 5,264,270
[45] Date of Patent: Nov. 23, 1993

[54] SQUEAK RESISTANT PANEL/WINDOW ASSEMBLY WITH ELASTOMERIC COATING

[75] Inventor: Raj K. Agrawal, Holland, Mich.

[73] Assignee: Donnelly Corporation, Holland, Mich.

[21] Appl. No.: 753,647

[22] Filed: Aug. 30, 1991

[51] Int. Cl.⁵ .................................................. B32B 9/00
[52] U.S. Cl. ................................. 428/192; 49/490.1; 52/400; 52/403; 277/227
[58] Field of Search .................. 277/227; 49/490, 491, 49/488; 52/400, 403; 428/192

[56] References Cited

U.S. PATENT DOCUMENTS

| | | |
|---|---|---|
| 4,538,380 | 9/1985 | Colliander .............................. 49/490 |
| 4,546,986 | 10/1985 | Roselli .................................... 52/403 |
| 5,060,440 | 10/1991 | Weaver ................................... 52/400 |
| 5,067,281 | 11/1991 | Dupuy ................................... 49/490 |
| 5,082,297 | 1/1992 | Flasher .................................. 277/227 |

*Primary Examiner*—Patrick J. Ryan
*Assistant Examiner*—Abraham Bahta
*Attorney, Agent, or Firm*—Price, Heneveld, Cooper, DeWitt & Litton

[57] ABSTRACT

A vehicle panel assembly and accompanying methods of manufacture are disclosed utilizing a relatively thin coating of an elastomeric composition on the panel gasket to eliminate or minimize squeaks or other undesirable noises that often originate from the panel assembly and vehicle body interface during vehicle movement. The squeak resistant elastomeric composition may be applied to the polymeric gasket as an in-mold release agent, or applied after gasket manufacture and comprises an elastomeric composition having a tensile modulus lower than that of the gasket substrate and preferably less than 50% of the tensile modulus of the polymeric gasket.

28 Claims, 2 Drawing Sheets

SQUEAK RESISTANT PANEL/WINDOW ASSEMBLY WITH ELASTOMERIC COATING

BACKGROUND OF THE INVENTION

The term "panel assemblies" as used refers to transparent, semi-transparent, opaque, and like panels framed by a gasket for incorporation in vehicle bodies or structures. Such panel assemblies typically comprise panels of window glass, however may include automobile taillight assemblies, decorative panels and the like.

Modern panel or window assemblies for use in automobiles are typically of two varieties. The first are modular or encapsulated window assemblies where the perimeter of the transparent panel has a gasket molded around it. The second type, referred to as laced window assemblies, utilize a gasket which is produced separately and then either attached to the perimeter of the panel or placed within the vehicle window mounting channel prior to mounting of the window. In either type of window assembly, the gasket serves as an interface between the window glass and the window mounting channel or surface of the vehicle body.

The gasket is typically a polymeric material such as EPDM rubbers (terpolymer of ethylene, propylene and diene monomers), polyvinyl chloride, olefinic polymers, thermosetting polymers, urethane, thermoplastic urethanes and thermoplastic elastomers. EPDM rubber is most commonly used for laced window assembly gaskets. Reaction injection molded (RIM) urethane and polyvinyl chloride are most commonly used for modular window assembly gaskets.

The gasket materials used today, especially the urethanes used in modular window assemblies are relatively stiff, having a tensile modulus at 100% elongation from about 1,000 to about 50,000 psi. The recent trend in using stiffer gaskets was prompted by the deficiencies inherent in the softer gasket materials known in the prior art, such as EPDM rubber. The softer materials do not provide and maintain as good a seal between the vehicle interior and external environment as do today's stiffer materials. Secondly, gaskets formed from softer materials are not as aesthetically appealing as stiffer materials in view of resulting bulges, shape deformation and irregularities in the softer material upon weathering, once the window assembly is mounted in the vehicle.

Various squeaks and other undesirable noises are often generated around such window assemblies, regardless of the gasket materials used. The generation of such noises is believed to result from differing degrees of rigidity between the window assembly and the vehicle body, primarily at the interface between the vehicle body and the window assembly. This behavior is particularly evident as the vehicle body shifts, torques or vibrates from uneven road surfaces or changes in the vehicle's velocity. The importance of suppressing such unwanted noises has become of increasing importance to auto manufacturers.

SUMMARY OF THE INVENTION

The present invention relates to a panel assembly in which the polymeric gasket surrounding the perimeter of a panel is coated with a relatively thin coating of an elastomeric material, at least where the gasket engages the vehicle body. This results in elimination or substantial reduction in audible squeaks or other undesirable noises often occurring when the vehicle is in motion.

DESCRIPTION OF THE PREFERRED EMBODIMENT

Figure 1:
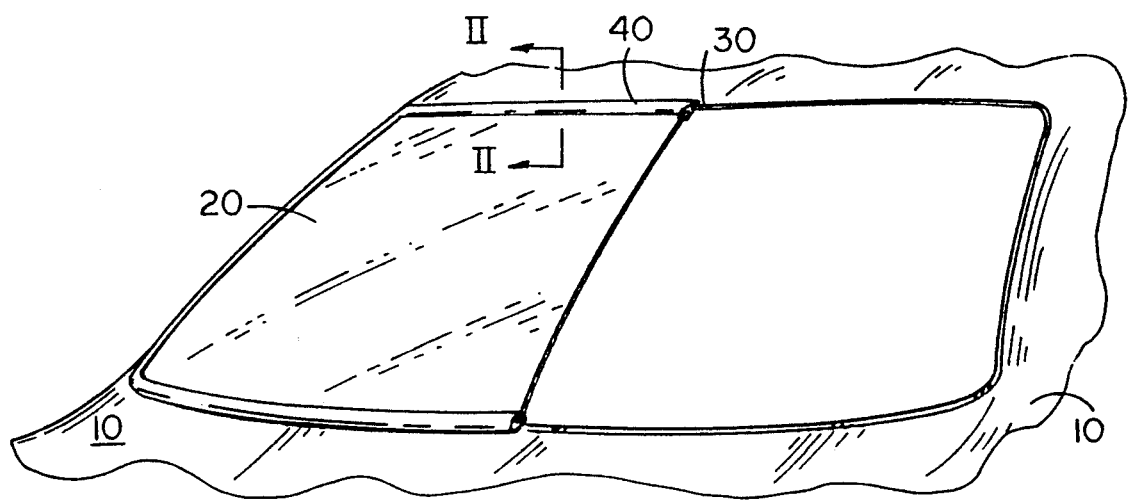
FIG. 1 illustrates a sectional view of a typical window assembly and vehicle body mounting channel.
Figure 2:
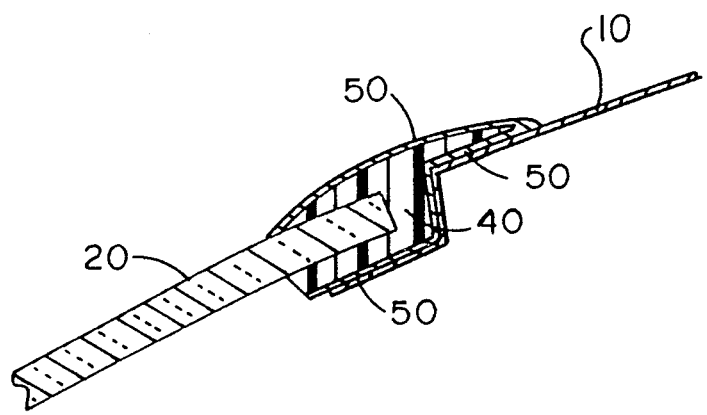
FIG. 2 is a cross-section, taken along plane II—II of FIG. 1.

Referring to FIG. 1, a typical automotive application is shown, where vehicle 10 has window assembly 20 mounted in the vehicle's body therein in mounting channel 30. A gasket 40 is utilized to seal the area between the two surfaces, 20 and 30. FIG. 2 represents a magnified cross-section of the window edge 20 and gasket 40. A relatively thin coating 50 of elastomeric material covers at least those portions of gasket 40 which engage the vehicle body 10. Coating 50 may be applied in two fashions; an in-mold application process and a post-mold application process.

Figure 3:
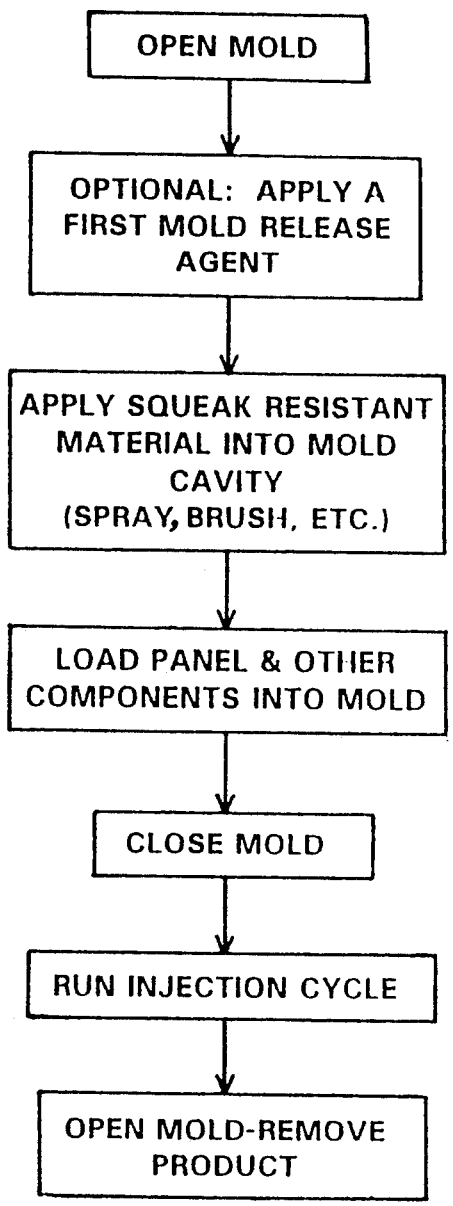
FIG. 3 is a flow diagram illustrating an in-mold application of the present invention.

Referring to FIG. 3, an in-mold application process is shown in which a polymeric gasket containing the squeak resistant composition is molded about the perimeter of a panel or window resulting in a modular window assembly. First, the molding apparatus is opened to receive a panel or window onto which a gasket is to be molded about. If necessary, a mold release agent may be applied to the surfaces of the mold cavity. A sufficient amount of the composition of the present invention is then applied to the desired surfaces. Application may be through a variety of methods such as spraying, brushing or the like. Spraying applications typically require a sufficiently low viscosity of the spray mixture. Thus, solvents or carriers may need to be added to the composition. Next, the panel or window piece is placed into the mold. The molding apparatus is then closed and the molding operation performed by injecting the polymeric material into the mold cavity. After the cycle is complete, the resulting modular window assembly is then removed and may be installed in the vehicle.

Another manner of depositing the composition is in a post-mold manner by spraying the composition onto either or both window assembly or vehicle body interface surfaces before they contact one another. Other methods of applying the composition to the interface surfaces may include brushing, wiping, dipping or any other similar means. It may be necessary to prime the contacting surfaces before applying the composition of the present invention.

Figure 4:
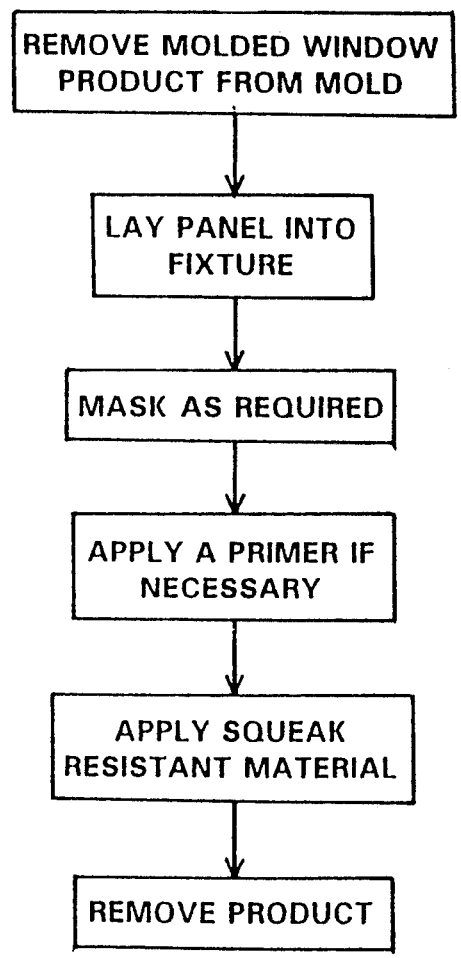
FIG. 4 is a flow diagram illustrating a post-mold application of the present invention.

FIG. 4 illustrates a post-mold application process in which a modular window assembly is formed. In this instance, after the modular window assembly is formed, the areas not to receive the squeak resistant coating may require masking. An adhesion promoting primer can be applied to the gasket surface to promote adhesion of the coating to the gasket. Then, sufficient amounts of the composition are applied to the desired areas. Installation may follow after appropriate curing or drying of coating 50.

Although not so limited, the present invention is especially beneficial for modular window assemblies as their relative gasket stiffness makes them particularly susceptible to unwanted noises. Such gaskets typically have a tensile modulus from about 1,000 to about 50,000 psi. With such a relatively high modulus, typical gaskets are unable to adequately absorb or dampen the vibrations generated during motion of the vehicle. "Elastomer" as used herein refers to thermoplastic and thermoset materials having a tensile modulus at 100% elongation less than 10,000 psi and having the ability to be substantially stretched or deformed under low loads. Such materials include vulcanized natural rubber, synthetic rubber, silicone gel, plasticized polyvinyl butyral, and urethane and vinyl foams. Elastomeric coating 50 used in the present invention preferably has a tensile modulus substantially lower than the tensile modulus of the gasket material. Preferably, the tensile modulus of the squeak resistant elastomeric composition is no greater than about 50% of the tensile modulus of the polymeric gasket. More preferably, the tensile modulus is less than about 1,000 psi and most preferably, the elastomeric coating has a tensile modulus of from about 50 to about 500 psi.

Coating 50 of the present invention contains as its principal ingredient an elastomeric material and in addition may contain: lubricants, coloring agents, fillers, solvents or carriers, and plasticizers. The elastomer is the critical and principal ingredient of the present invention and as such, should possess the following properties; ability to adhere to the contacting surfaces of the window assembly, vehicle body, or both; water insolubility; and have sufficient durability to humidity, sunlight, moisture, and temperature effects. The material selected should retain its mechanical properties from $-40°$ C. to $80°$ C. An elastomer which cures by the addition of heat or radiation may also be suitable. An elastomer which evaporates a solvent or carrier upon curing is acceptable. The elastomer may be selected from a variety of elastomeric materials known to those skilled in the art. Examples of suitable materials include; urethane elastomers (i.e. BETASEAL TM 57302 of Essex Specialty Products, a moisture curing urethane); thermoplastic elastomers; thermoset elastomers; EPDM rubber (terpolymer of ethylene, propylene, and diene monomers); silicone rubbers; acrylic latex, plasticized polyvinyl butyral, and pressure sensitive elastomeric adhesives. The preferred elastomer is one having the above characteristics, and a tensile modulus less than about 1,000 psi, and most preferably from about 50 to about 500 psi.

The addition of lubricants, coloring agents, fillers, and solvents or carriers in amounts set forth below will not significantly affect the resulting tensile modulus of coating 50. Elastomers having a tensile modulus higher than that of the gasket material may also be used in coating 50 provided plasticizers are added to lower the tensile modulus of coating 50, preferably such that it is substantially lower than the tensile modulus of the gasket material.

The lubricant may be selected from a variety of agents known in the art such as; molybdenum disulfide, tungsten disulfide, graphite, boron nitride, phosphate lubricants, silicones, fluoropolymer lubricants (i.e. TEFLON TM ) and metallic carboxylate lubricants which include metallic stearates. Typical metallic carboxylate lubricants may include stearates, oleates, octoates, palmitates, laurates, behenates, ricinoleates, and the like. Typical metallic stearates which may be used in the present composition include, but are not limited to: aluminum stearate, barium stearate, calcium stearate, lithium stearate, magnesium stearate, potassium stearate, sodium stearate, strontium stearate, and zinc stearate. Both water soluble and water insoluble lubricants may be utilized, however it is preferred to use a water insoluble lubricant. The primary requirement in selecting a lubricant is that it disperse readily in the elastomeric material, and in a solvent or carrier if one is used. The amount of lubricant which may be added to the elastomer may range anywhere from trace amounts up to 50% by weight of total composition. The preferred range is from about 10% to about 20%.

Coloring agents or pigments may be added to the present composition in amounts as demanded by the particular application. Fillers may be added, also depending upon the particular requirements of the application.

Any suitable carrier may be used in formulating coating 50 to facilitate its application. Added carrier is not retained in coating 50. The function of added carrier can be two-fold. The first is to lower the viscosity of the coating, thereby facilitating its application. The second function which may be realized during post-mold application, is to promote bonding of the coating to the gasket material substrate. Upon application of coating 50 containing carrier to the gasket substrate, the added carrier causes the outer surface layer of substrate material to temporarily "swell", thereby increasing the substrate surface area and enabling a greater degree of bonding to occur between the gasket substrate and coating. Swelling of the gasket surface may promote diffusion of coating 50 into the gasket material thereby improving the bonding characteristics. Examples of carriers include naptha (i.e. a mixture of relatively high boiling point hydrocarbons); toluene; alcohols; ketones; water; and benzene if used in slight amounts as a co-solvent. Suitable carriers may be added in amounts as required by the particular application. Such amounts typically range from about 5% to 95% of the coating composition weight prior to application.

Plasticizers may be added in appropriate amounts to lower the tensile modulus of coating 50. Examples of suitable plasticizers are organic esters (i.e. phthalates); hydrocarbon oils (i.e. HB-40 TM by Monsanto Company); low molecular weight polymers (i.e. poly(propylene glycol) ester). Secondary plasticizers may also be used such as epoxydized oils and esters. The particular plasticizer used will depend upon the ingredients comprising coating 50 and gasket substrate material. Amounts required will primarily depend upon the difference between the initial and desired tensile modulus of coating 50.

When coating 50 is applied in an in-mold fashion the coating may also function as an abherent or mold release agent in the gasket manufacture. This function will be dependent upon the elastomer and other components selected for use in formulating coating 50.

The application thickness of the present composition depends primarily upon the elastomeric material selected, but may also depend upon the characteristics of the vehicle, panel, and interface surfaces. The application thickness also depends upon the composition to be applied, and the method of application. The thickness of coating 50 may range from about 10 microns to about 2500 microns. The preferred thickness of coating 50 is about 100 microns to about 250 microns. Beyond a thickness of 2500 microns, a thicker coating may result in bulges and irregularities which may not be aesthetically appealing.

In another embodiment of the present invention, common soap, wax or both, having a softening point above about 80° C. may be applied as a further thin coating onto the thin coating of the present invention to serve as an additional squeak resistant agent.

The polymeric gasket surrounding the perimeter of the panel or window may optionally contain numerous stipples which are small cavities or depressions formed on the exterior surface of the polymeric gasket material. Such stipples may be formed in a variety of shapes or patterns in the gasket material. A typical stipple is a honeycomb-shape depression from 75 to about 125 microns in depth and about 2,000 microns in diameter and is spaced from adjacent stipples by about 375 microns. By incorporating such stipples on the surface of the gasket, additional surface area is provided for bonding of the composition of the present invention to the polymeric gasket material.

EXAMPLES 1-6

In the following examples, various material coatings, without the addition of any lubricant, were applied having a coating thickness of at least 100 microns onto the reaction injection molded urethane gasket surfaces of a backlite assembly contacting a vehicle's painted sheet metal surface. The gasket material had a tensile modulus of 2435 psi. The resulting panel assembly was then mounted on the rear of a 1992 automobile. The vehicle was then driven over bumpy terrain while listening for squeaks and other unwanted noises.

| Example | Coating Comp. | Tensile Modulus (psi) | Squeak Vulnerability |
|---|---|---|---|
| 1 | (no coating) | — | Squeak |
| 2 | Waterborne Urethane[1] | 10,300 | Squeak |
| 3 | 55% Urethane Elastomer[2] 45% Toluen | 250 | Minimal squeak |
| 4 | 48.7% Urethane Elastomer[2] 39.8% Toluene 11.5% Plasticizer[3] | 80 | No audible squeak |
| 5 | In-mold paint[4] | 70,000 | Squeak |
| 6 | Acrylic latex[5] | 60 | No audible squeak |

[1] From Dorrie Process Co., Inc. Norwalk, CO, Product No. 9016.
[2] "Betaseal ™ -57302", From Essex Speciality Products, Inc., Hillsdale, MI.
[3] HB-40 ™ from Monsanto Company, St. Louis, MO.
[4] From Titan Finishes Corp., Detroit, MI, #VL8-3687FL/FA.
[5] From B. F. Goodrich Company, Cleveland, OH, Hycar ™ -2671.

Example 1 illustrates an uncoated gasketed backlite assembly and resulting squeaks that occurred. Examples 2 and 5 illustrate applications of coatings having a tensile modulus greater than that of the gasket material. These coatings did not reduce the squeak of the assembly. In example 3, a coating having a tensile modulus of 250 psi reduced the squeak and other noises. Examples 4 and 6 demonstrate the most preferred embodiments of the present invention as no audible squeaks were present.

It is to be noted that the present invention is not limited to automobiles. A multitude of other applications are envisioned where a mounting structure and window assembly interface are subject to external forces such as shifting, torque, and vibrations resulting in squeaks and other undesirable noises, such as airplanes, marine crafts, trains, and buses.

Of course, it is understood that the foregoing is merely a preferred embodiment of the invention and that various changes and alterations can be made without departing from the spirit and broader aspects thereof as set forth in the appended claims.

The embodiments of the invention in which an exclusive property or privilege is claimed are defined as follows:

1. A vehicle panel assembly comprising:
a panel;
a polymeric gasket around the perimeter of said panel; and
a relatively thin coating of a squeak resistant elastomeric composition on said polymeric gasket having a thickness from about 10 microns to about 2500 microns, said coating applied onto at least those surfaces of said gasket which will engage portions of the vehicle to which said panel assembly is to be joined, wherein said elastomeric composition has a tensile modulus at 100% elongation less than 10,000 psi.

2. A vehicle panel assembly in accordance with claim 1 wherein said squeak resistant elastomeric composition includes an elastomer material selected from the group consisting of urethane elastomers, thermoplastic elastomers, thermoset elastomers, EPDM rubber, silicone rubber, acrylic latex, plasticized polyvinyl butyral and pressure sensitive elastomeric adhesives.

3. A vehicle panel assembly in accordance with claim 2 wherein said squeak resistant elastomeric composition on said polymeric gasket has a thickness of from about 10 microns to about 2500 microns.

4. A vehicle panel assembly in accordance with claim 2 wherein said relatively thin coating of said squeak resistant elastomeric composition on said polymeric gasket has a thickness between about 100 microns to about 250 microns.

5. A vehicle panel assembly in accordance with claim 4 wherein said polymeric gasket contains a plurality of stipples formed on the surface of said polymeric gasket to provide additional surface area for said squeak resistant elastomeric composition to adhere to, each said stipple being about 75 to about 125 microns in depth and about 2,000 microns in diameter.

6. A vehicle panel assembly in accordance with claim 4 wherein said polymeric gasket has a tensile modulus of between about 1,000 psi to about 50,000 psi.

7. A vehicle panel assembly in accordance with claim 6 in which said composition has a tensile modulus of about 50% or less of the tensile modulus of said gasket.

8. A vehicle panel assembly in accordance with claim 7 wherein said panel assembly further comprises a thin coating of at least one of a common soap and wax, applied onto said relatively thin coating of said squeak resistant elastomeric composition, each of said common soap and said wax having a softening point above 80° C.

9. A vehicle panel assembly in accordance with claim 6 wherein said squeak resistant elastomeric composition has a tensile modulus of from about 1000 psi to about 50 psi.

10. A vehicle panel assembly in accordance with claim 6 wherein said squeak resistant elastomeric composition has a tensile modulus of from about 50 psi to about 500 psi.

11. A vehicle panel assembly in accordance with claim 4 in which said composition has a tensile modulus of about 50% or less of the tensile modulus of said gasket.

12. A vehicle panel assembly in accordance with claim 4 wherein said squeak resistant elastomeric composition has a tensile modulus of from about 1000 psi to about 50 psi.

13. A vehicle panel assembly in accordance with claim 4 wherein said squeak resistant elastomeric composition has a tensile modulus of from about 50 psi to about 500 psi.

14. A vehicle panel assembly in accordance with claim 1 wherein said relatively thin coating of said squeak resistant elastomeric composition on said polymeric gasket has a thickness between about 100 microns to about 250 microns.

15. A vehicle panel assembly in accordance with claim 14 in which said composition has a tensile modulus of about 50% or less of the tensile modulus of said gasket.

16. A vehicle panel assembly in accordance with claim 14 wherein said squeak resistant elastomeric composition has a tensile modulus of from about 1000 psi to about 50 psi.

17. A vehicle panel assembly in accordance with claim 14 wherein said squeak resistant elastomeric composition has a tensile modulus of from about 50 psi to about 500 psi.

18. A vehicle panel assembly in accordance with claim 1 in which said composition has a tensile modulus of about 50% or less of the tensile modulus of said gasket.

19. A vehicle panel assembly in accordance with claim 1 wherein said squeak resistant elastomeric composition has a tensile modulus of from about 1000 psi to about 50 psi.

20. A vehicle panel assembly in accordance with claim 1 wherein said squeak resistant elastomeric composition has a tensile modulus of from about 50 psi to about 500 psi.

21. A vehicle panel assembly in accordance with claim 1 in which said elastomeric composition includes a lubricant selected from the group consisting of metallic carboxylate lubricants, molybdenum disulfide, tungsten disulfide, graphite, boron nitride, phosphate lubricants, silicones, and fluoropolymer lubricants.

22. A vehicle panel assembly in accordance with claim 21 wherein said squeak resistant elastomeric composition includes an elastomer material selected from the group consisting of urethane elastomers, thermoplastic elastomers, thermoset elastomers, EPDM rubber, silicone rubber, acrylic latex, plasticized polyvinyl butyral and pressure sensitive elastomeric adhesives.

23. A vehicle panel assembly in accordance with claim 21 in which said composition has a tensile modulus of about 50% or less of the tensile modulus of said gasket.

24. A vehicle panel assembly in accordance with claim 21 wherein said squeak resistant elastomeric composition has a tensile modulus of from about 1000 psi to about 50 psi.

25. A vehicle panel assembly in accordance with claim 21 wherein said squeak resistant elastomeric composition has a tensile modulus of from about 50 psi to about 500 psi.

26. A vehicle panel assembly in accordance with claim 1, wherein said polymeric gasket is a urethane gasket.

27. A vehicle panel assembly in accordance with claim 1, wherein said portions of said vehicle include a painted metal surface.

28. A vehicle panel assembly comprising;
a panel;
a urethane polymeric gasket disposed along the perimeter of said panel; and
a relatively thin coating of a squeak resistant elastomeric composition on said polymeric gasket, having a thickness from about 10 microns to about 2500 microns, said coating applied onto at least those surfaces of said gasket which will engage a painted metal surface of the vehicle to which said panel assembly is to be joined.

* * * * *

UNITED STATES PATENT AND TRADEMARK OFFICE
CERTIFICATE OF CORRECTION

PATENT NO. : 5,264,270
DATED : November 23, 1993
INVENTOR(S) : Raj K. Agrawal

It is certified that error appears in the above-indentified patent and that said Letters Patent is hereby corrected as shown below:

Column 5, Line 38
"45% Toluen" should be --45% Toluene--;

Signed and Sealed this

Twenty-sixth Day of July, 1994

Attest:

BRUCE LEHMAN

Attesting Officer       Commissioner of Patents and Trademarks